(12) United States Patent
Miranda et al.

(10) Patent No.: US 9,888,420 B2
(45) Date of Patent: Feb. 6, 2018

(54) PROCESSING HANDOVERS FOR MOBILE TERMINALS CAPABLE OF INTERFERENCE CANCELLATION

(71) Applicant: Alcatel-Lucent USA Inc., Murray Hill, NJ (US)

(72) Inventors: Heinz A. Miranda, Cary, IL (US); Andrew Repoza, Naperville, IL (US); Michael DeNardo, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/196,667

(22) Filed: Jun. 29, 2016

(65) Prior Publication Data
US 2018/0007603 A1   Jan. 4, 2018

(51) Int. Cl.
*H04W 36/00* (2009.01)
*H04W 36/22* (2009.01)
*H04W 52/36* (2009.01)

(52) U.S. Cl.
CPC ....... *H04W 36/22* (2013.01); *H04W 36/0055* (2013.01); *H04W 52/365* (2013.01)

(58) Field of Classification Search
CPC H04W 36/22; H04W 36/0055; H04W 52/365
USPC ............ 455/436, 442, 432.1, 435.1; 370/331
See application file for complete search history.

(56) References Cited

U.S. PATENT DOCUMENTS

| | | | |
|---|---|---|---|
| 8,131,295 B2 | 3/2012 | Wang et al. | |
| 8,699,461 B2 | 4/2014 | Qian et al. | |
| 8,848,662 B2 | 9/2014 | Chun et al. | |
| 8,886,191 B2 | 11/2014 | Wang et al. | |
| 8,891,484 B2 | 11/2014 | Ahluwalia | |
| 9,055,498 B2 | 6/2015 | Ban et al. | |

(Continued)

FOREIGN PATENT DOCUMENTS

| WO | WO2011143815 A1 | 11/2011 |
|---|---|---|
| WO | WO2013112090 A1 | 8/2013 |

(Continued)

OTHER PUBLICATIONS

International Search Report and Written Opinion; dated Sep. 29, 2017 for PCT Application No. PCT/US2017/037387.

*Primary Examiner* — Nghi H Ly
(74) *Attorney, Agent, or Firm* — Mendelsohn Dunleavy, P.C.; Yuri Gruzdkov

(57) ABSTRACT

We disclose various embodiments of methods and apparatus for processing handovers of mobile terminals between base stations of a wireless communication system. An example handover algorithm used for this purpose enables the handover threshold to be increased for some mobile terminals, on a terminal-by-terminal basis, thereby individually expanding the range of the serving cell for each of such terminals. In an example embodiment, the handover-threshold determination is carried out based on physical-resource-block usage of the target cell. The extent of the cell-range expansion depends on whether or not the reference signals of the serving and target cells interfere with each other. Embodiments of the disclosed handover algorithm can advantageously reduce the number of failed handovers by allowing some communication sessions to run to completion before a handover is triggered.

21 Claims, 5 Drawing Sheets

(56) References Cited

U.S. PATENT DOCUMENTS

| | | |
|---|---|---|
| 9,113,374 B2 | 8/2015 | Wang et al. |
| 2012/0188884 A1 | 7/2012 | Simonsson et al. |
| 2012/0282864 A1 | 11/2012 | Dimou et al. |
| 2013/0143572 A1* | 6/2013 | Kang .................... H04W 36/22 455/437 |
| 2014/0321369 A1 | 10/2014 | Davydov et al. |
| 2014/0378145 A1* | 12/2014 | Legg ................. H04W 36/0083 455/437 |
| 2015/0092666 A1 | 4/2015 | Wu et al. |
| 2016/0119936 A1 | 4/2016 | Kim et al. |

FOREIGN PATENT DOCUMENTS

| | | |
|---|---|---|
| WO | 2014165852 A1 | 10/2014 |
| WO | WO2015063626 A1 | 5/2015 |

* cited by examiner

PROCESSING HANDOVERS FOR MOBILE TERMINALS CAPABLE OF INTERFERENCE CANCELLATION

BACKGROUND

Field

The present disclosure relates to wireless communications and, more specifically but not exclusively, to processing handovers for mobile terminals capable of interference cancellation.

Description of the Related Art

This section introduces aspects that may help facilitate a better understanding of the disclosure. Accordingly, the statements of this section are to be read in this light and are not to be understood as admissions about what is in the prior art or what is not in the prior art.

In wireless communications, the term "handover" refers to a process of transferring an ongoing call or data session from one channel (e.g., base station) connected to the core network to another channel (e.g., another base station) connected to the core network. One or more parameters of the signals in the channels may be monitored and assessed to make a handover decision. The handover can be initiated by the mobile terminal or by a base station.

SUMMARY OF SOME SPECIFIC EMBODIMENTS

Disclosed herein are various embodiments of methods and apparatus for processing handovers of mobile terminals between base stations of a wireless communication system. An example handover algorithm used for this purpose enables the handover threshold to be increased for some mobile terminals, on a terminal-by-terminal basis, thereby individually expanding the range of the serving cell for each of such terminals. In an example embodiment, the handover-threshold determination is carried out based on physical-resource-block usage of the target cell. The extent of the cell-range expansion depends on whether or not the reference signals of the serving and target cells interfere with each other. Embodiments of the disclosed handover algorithm can advantageously reduce the number of failed handovers by allowing some communication sessions to run to completion before a handover is triggered.

According to an example embodiment, provided is a communication method comprising the steps of: determining a handover-offset value to change a handover threshold to be used to trigger a handover of a wireless connection of a mobile terminal from a first cell to a second cell, with the handover-offset value being determined based on a resource-utilization level of the second cell; and transmitting a control message to cause the mobile terminal to change the handover threshold.

According to another example embodiment, provided is an apparatus comprising: an electronic processor operable to determine a handover-offset value to change a handover threshold to be used to trigger a handover of a wireless connection of a mobile terminal from a first cell to a second cell, the handover-offset value being determined based on a resource-utilization level of the second cell; and a radio transmitter operable to transmit a control message to cause the mobile terminal to change the handover threshold.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
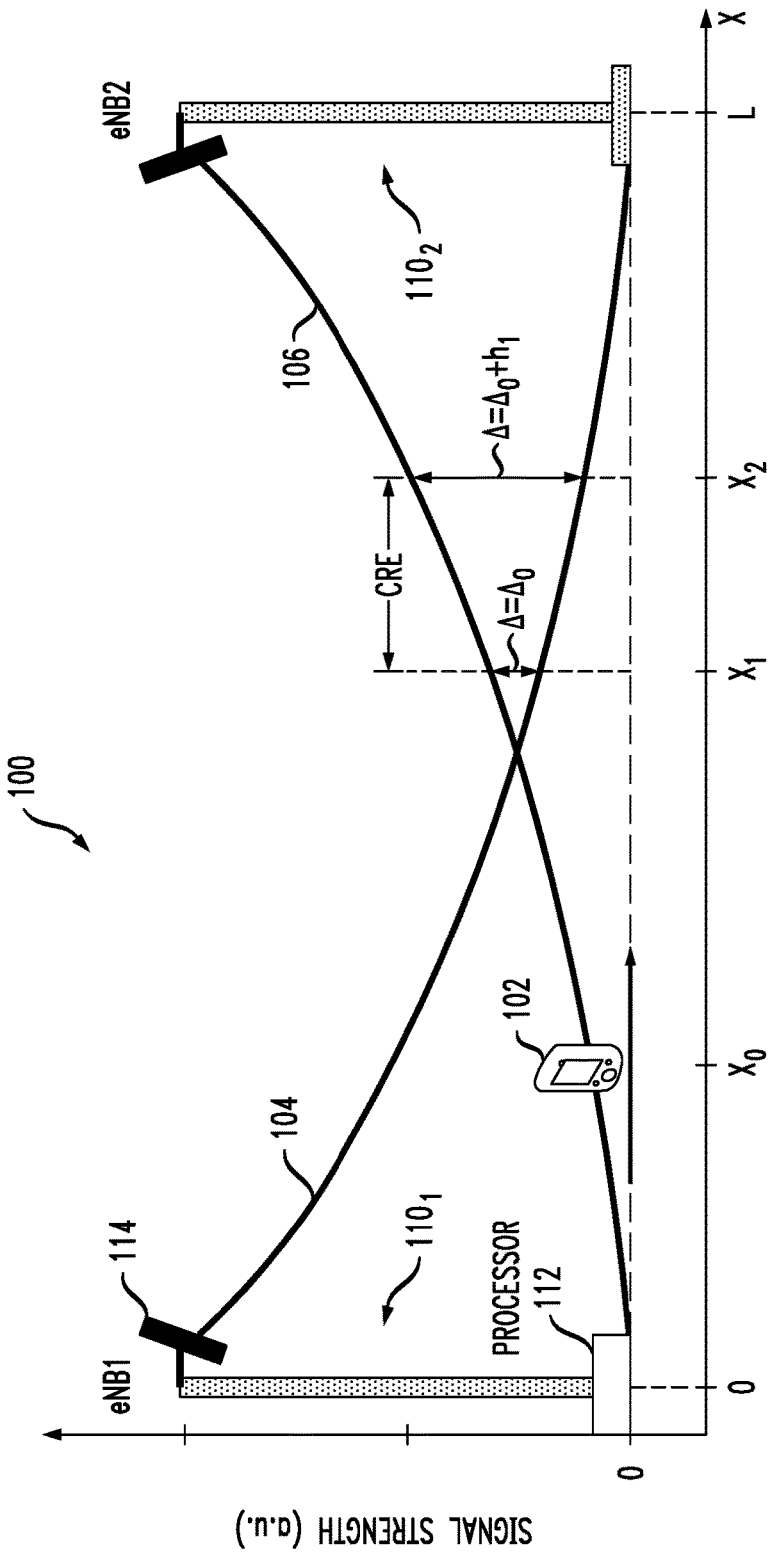
FIG. 1 illustrates a communication system in which various embodiments can be used.

The following acronyms/abbreviations are used in the description of various embodiments and/or in the accompanying drawings:

3GPP Third Generation Partnership Project;
4G (5G) Fourth Generation (Fifth Generation);
BLER Block Error Rate;
CRE Cell Range Expansion;
CRS Cell-specific Reference Signal;
CRS-IC Cell-specific Reference-Signal Interference Cancellation;
DL Downlink;
eNB Evolved Node B;
GBR Guaranteed Bit Rate;
HO Handover;
IC Interference Cancellation;
LTE Long Term Evolution;
LUT Look-Up Table;
MR Measurement Report;
NAICS Network-Assisted Interference Cancellation/Suppression;
OFDM Orthogonal Frequency-Division Multiplexing;
OFDMA Orthogonal Frequency-Division Multiple Access;
PCI Physical Cell Identifier;
PDSCH Physical Downlink Shared Channel;
PHR Power Headroom Report;
PRB Physical Resource Block;
RE Resource Element;
RRC Radio Resource Control;
RSRP Reference-Signal Received Power;
RSS Received Signal Strength;
SINR Signal-to-Noise and Interference Ratio;
UE User Equipment; and
UL Uplink.

In 4G wireless systems, a handover (HO) is a break-before-make procedure. This HO attribute causes 4G (and possibly 5G) handovers to have an inherent probability of failure, typically on the order of 1%. To inhibit this type of failure it might be advantageous to keep the call or data session (hereafter referred to as "connection") on the currently serving cell for as long as the radio conditions permit, until the handover becomes necessary or unavoidable. However, interference caused by reference signals of the neighboring cells can sometimes prevent the mobile terminal (also often referred to as user equipment, UE) from continuing on with the currently serving cell near the cell-range boundary.

With the introduction of cell-specific reference-signal interference cancellation (CRS-IC), the UE is becoming capable of mitigating the adverse effects of interference. This capability can now be leveraged to expand the effective cell range, e.g., through improvement in the demodulation of the physical downlink shared channel (PDSCH) near the cell boundary. In the case of colliding reference signals, the improvement can be achieved through improved coherent detection. In the case of non-colliding reference signals, the improvement can be achieved through clearer reception of the PDSCH resource elements that collide with reference signals of other (than source and target) cells.

Although the benefits of CRS-IC can be significant, the conditions under which these benefits can be realized might be limited. For example, there is an inverse relationship between the improvement in throughput due to the use of CRS-IC and the resource-utilization level (e.g., PRB usage) of the aggressor cell. Hence, the number of handovers cannot be reduced by simply changing HO thresholds on a system-wide basis, because doing so might actually degrade the system performance when the resource-utilization level is relatively high. In addition, there might be other circumstances in which an attempt to delay a handover can be detrimental.

At least some of the above-indicated problems can be addressed using various embodiments of the HO procedures disclosed herein. An example HO procedure enables dynamic modification of the HO threshold on a connection-by-connection basis by taking into account one or more of the following factors: (i) the resource-utilization level of the target cell; (ii) the colliding or non-colliding nature of the relevant reference signals; (iii) radio conditions reported by the UE; (iv) the amount of data to be transmitted, etc. Based on such factors, the HO threshold for a specific connection can be individually lowered, thereby effectively expanding the range of the serving cell for an individual mobile terminal. The range expansion tends to increase the likelihood that the corresponding call or data session can be completed before a handover is triggered, thereby reducing the number of handovers and the associated (inherent) connection failures. Some embodiments can advantageously be implemented using exclusively the procedures that are already defined in the existing 3GPP technical specifications.

FIG. 1 graphically illustrates a communication system 100 in which various embodiments can be used. System 100 comprises base stations $110_1$ and $110_2$ separated from one another by distance L, with each of the base stations being connected, as known in the art, to a core network (not explicitly shown in FIG. 1). In an example embodiment, each of base stations $110_1$ and $110_2$ can be an instance of an evolved Node B (eNB).

Base station $110_1$ comprises a processor 112 and a radio transmitter 114. Processor 112 operates to perform relevant signal processing, including but not limited to setting HO parameters, running an HO algorithm, performing the corresponding calculations and comparisons, supplying numerical values to be used in control messages, running one or more timers, and processing signals that are used in communications carried out by way of the core network. Radio transmitter 114 includes one or more antennas and operates to transmit radio signals to mobile terminals, such as the LTE UE, and receive radio signals from such mobile terminals. Base station $110_2$ can be similar to base station $110_1$.

A mobile terminal 102 can carry a connection with a remote party through either of base stations $110_1$ and $110_2$, e.g., to wirelessly send and receive data. Each of base stations $110_1$ and $110_2$ operates to transmit respective cell-specific reference signals (CRS's) to support the corresponding uplink (UL) and downlink (DL) transmissions. The CRS's occupy pre-defined resource elements (REs) on the orthogonal frequency-division multiple access (OFDMA) resource grid and do not carry any user data. For example, in LTE, the frequency spacing between two reference symbols in the same physical resource block (PRB) is 45 kHz. In the frequency dimension of the radio frame, there is one reference symbol per six subcarriers of the corresponding OFDM symbol. The reference symbols are staggered such that there is one reference symbol per three subcarriers within each PRB. Mobile terminal 102 can use the CRS's, e.g., for (i) cell search and initial acquisition, (ii) DL channel estimation for coherent demodulation/detection, and (iii) DL channel-quality measurements.

At the initial position, $x_0$, indicated in FIG. 1, mobile terminal 102 is connected to base station $110_1$. At position $x_0$, the signal strength corresponding to base station $110_1$ is higher than the signal strength corresponding to base station $110_2$, as is evident from the comparison of the corresponding signal-strength curves, which are labeled in FIG. 1 as 104 and 106, respectively. In various embodiments, the "signal strength" represented by curves 104 and 106 can be the received signal strength (RSS), the reference-signal received power (RSRP), or any other suitable signal-strength/quality indicator suitable for making an HO decision.

As mobile terminal 102 moves farther away from base station $110_1$ and closer to base station $110_2$, the signal strength corresponding to base station $110_1$ is decreasing as indicated by curve 104 while the signal strength corresponding to base station $110_2$ is increasing as indicated by curve 106. At position $x_1$ indicated in FIG. 1, mobile terminal 102 reaches a point where the currently operative HO condition is met, e.g., in accordance with Eq. (1):

$$S_2 \geq S_1 + \Delta \qquad (1)$$

where $S_1$ and $S_2$ are the signal strengths corresponding to base stations $110_1$ and $110_2$, respectively; and $\Delta$ is the present HO-threshold value. For the sake of this particular example, let us assume that $\Delta = \Delta_0$ at position $x_1$, where $\Delta_0$ is a default value that is set system-wide.

After mobile terminal 102 determines that the HO condition is met, mobile terminal 102 initiates a handover by sending an appropriate message to base station $110_1$. However, according to an example embodiment, base station $110_1$ may determine that the connection is eligible for cell range expansion (CRE), e.g., as described in more detail below in reference to FIGS. 2-5, and choose not to execute the corresponding HO sequence. Instead, base station $110_1$ may (i) derive an appropriate non-zero HO-offset value, $h_1$, based on one or more pertinent parameters, such as the resource-utilization level of the cell corresponding to base station $110_2$, e.g., as described in more detail below in reference to FIGS. 5A-5B, and (ii) provide mobile terminal 102 with a new threshold value, e.g., calculated in accordance with Eq. (2):

$$\Delta = \Delta_0 + h_1 \qquad (2)$$

The new value of $\Delta$ calculated using Eq. (2) causes the HO condition expressed by Eq. (1) to be met at position $x_2$ that is farther away from base station $110_1$ than position $x_1$, e.g., as indicated in FIG. 1. The latter is a manifestation of the CRE, as indicated by the correspondingly labeled double-headed arrow in FIG. 1. A person of ordinary skill in the art will appreciate that the underlying technical capability that enables the CRE is the above-mentioned CRS-IC. Example methods and apparatus that can be used to provide the UE with a CRS-IC capability are disclosed, e.g., in U.S. Patent Application Publication Nos. 2014/0321369, 2015/0092666, and 2016/0119936, and the International Patent Application Publication WO 2014/165852, all of which are incorporated herein by reference in their entirety. Some embodiments may rely on network-assisted interference cancellation/suppression (NAICS) instead of or in addition to the CRS-IC.

Example HO procedures that can be used to implement the CRE illustrated in FIG. 1 are described in more detail below in reference to FIGS. 2-5. As already indicated above, the CRE can altogether prevent handovers for some connections, thereby reducing the total number of handovers in system 100 and, as such, occurrence of connection failures. A person of ordinary skill in the art will understand that some embodiments can be practiced in both homogeneous and heterogeneous cells of the corresponding wireless communication system.

Figure 2:
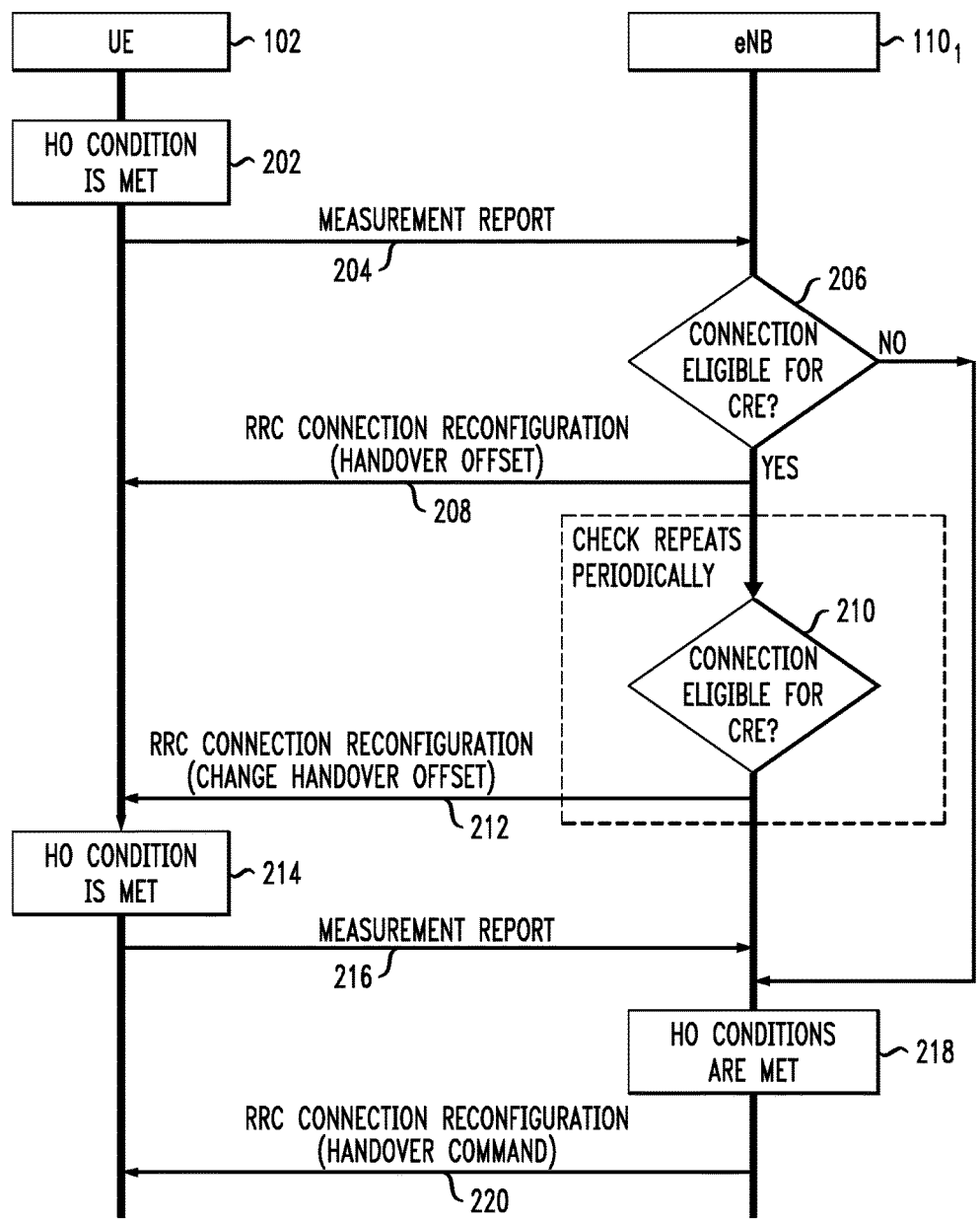
FIG. 2 shows a flowchart of a handover method that can be used in the communication system of FIG. 1 according to an embodiment.

FIG. 2 shows a flowchart of an HO method 200 that can be used in system 100 (FIG. 1) according to an embodiment. For illustration purposes, method 200 is shown and described in reference to a configuration in which base station $110_1$ anchors the serving cell for mobile terminal 102. As such, the cell corresponding to base station $110_1$ is the source cell with respect to the contemplated handover. The cell corresponding to base station $110_2$ can be the target cell for that handover. The vertical lines that extend down in FIG. 2 from each of the blocks depicting mobile terminal 102 and base station $110_1$ represent increasing time. Each of the horizontal arrows that connect the time lines represents a respective message transmitted between mobile terminal 102 and base station $110_1$. The direction of the arrow indicates the transmission direction for the message.

At step 202 of method 200, mobile terminal 102 determines that the HO condition is satisfied. This determination can be made, e.g., based on Eq. (1). Step 202 is the first occurrence of the affirmative determination that the HO condition is satisfied for the connection in question. Hence, the HO-threshold value used at step 202 is $\Delta=\Delta_0$.

After the affirmative determination of step 202, mobile terminal 102 transmits to base station $110_1$ a corresponding measurement report (MR) 204. In an example embodiment, MR 204 contains the signal-strength values $S_1$ and $S_2$ (see Eq. (1)) and, optionally, the signal strength value(s) corresponding to one or more additional specified neighbor cells (if any). In some embodiments, MR 204 may also contain other information that is implementation-specific to the HO decision algorithm employed by base station $110_1$.

At step 206, base station $110_1$ carries out an initial determination of whether or not the connection of mobile terminal 102 is eligible for CRE. An example embodiment of step 206 is described in more detail below in reference to FIG. 3.

If base station $110_1$ determines that the connection is not eligible for CRE, then the base station proceeds to execute step 218.

If base station $110_1$ determines that the connection is eligible for CRE, then the base station sends to mobile terminal 102 an RRC connection-reconfiguration message 208 that carries the value of HO offset $h_1$ (see Eq. (2)). In an example embodiment, base station $110_1$ can determine the value of HO offset $h_1$ to be sent by way of message 208, e.g., as described in more detail below in reference to FIGS. 5A-5B. Mobile terminal 102 responds to message 208 by modifying the present HO-threshold value $\Delta$, e.g., in accordance with Eq. (2). The resulting higher value of $\Delta$ then causes the HO condition of Eq. (1) to no longer be satisfied at the current location of mobile terminal 102. As a result, mobile terminal 102 takes no further action with respect to the handover that was contemplated at step 202.

After sending message 208, base station $110_1$ also starts a first CRE eligibility-check timer. If the first CRE eligibility-check timer expires before the next MR (labeled 216 in FIG. 2) is received from mobile terminal 102, then base station $110_1$ proceeds to execute step 210. If base station $110_1$ receives MR 216 before the first CRE eligibility-check timer expires, then the base station proceeds to execute step 218.

At step 210, base station $110_1$ carries out a follow-up determination of whether or not the connection corresponding to mobile terminal 102 is still eligible for CRE. An example embodiment of step 210 is described in more detail below in reference to FIG. 4.

After the follow-up CRE eligibility-check of step 210 is completed, base station $110_1$ proceeds to send to mobile terminal 102 an RRC connection-reconfiguration message 212. However, the contents of message 212 depend on whether or not the connection is found eligible for CRE at step 210.

If base station $110_1$ determines that the connection is still eligible for CRE, then the base station may send to mobile terminal 102 an RRC connection-reconfiguration message 212 that carries a new value of HO offset $h_1$ (see Eq. (2)), e.g., when a change of $h_1$ is warranted by the changed circumstances assessed at step 210. If base station $110_1$ determines that the connection is no longer eligible for CRE, then the base station sends to mobile terminal 102 an RRC connection-reconfiguration message 212 that carries a zero value of HO offset $h_1$. Mobile terminal 102 responds to message 212 by modifying the present HO-threshold value $\Delta$, e.g., in accordance with Eq. (2).

After performing step 210, base station $110_1$ also starts a second CRE eligibility-check timer. In various embodiments, the expiration time of the second CRE eligibility-check timer can be the same as or different from the expiration time of the first CRE eligibility-check timer. If the second CRE eligibility-check timer expires before MR 216 is received from mobile terminal 102, then base station $110_1$ proceeds to repeat step 210 and restart the second CRE eligibility-check timer. Depending on the circumstances, step 210 can be repeated multiple times before MR 216 is received.

If base station $110_1$ receives MR 216 before the second CRE eligibility-check timer expires, then the base station proceeds to execute step 218.

At step 214, mobile terminal 102 determines that the HO condition is satisfied. This determination can be made, e.g., based on Eq. (1). Step 214 is generally similar to step 202, except that it might use a different value of $\Delta$, which is set as already explained above based on messages 208 and 212.

After the affirmative determination of step 214, mobile terminal 102 transmits to base station $110_1$ a corresponding MR 216. In an example embodiment, MR 216 can be analogous to MR 204.

At step 218, base station $110_1$ verifies that all relevant HO conditions are satisfied for transferring the connection of mobile terminal 102 to a target base station, e.g., base station $110_2$.

After performing step 218, base station 110₁ sends to mobile terminal 102 an RRC connection-reconfiguration message 220 that carries a handover command. All involved entities then execute, as known in the art, an HO sequence that results in the connection corresponding to mobile terminal 102 to be transferred to the target base station. Example HO sequences that can be used for this purpose are disclosed, e.g., in U.S. Pat. Nos. 8,131,295, 8,699,461, 8,848,662, 8,886,191, 8,891,484, 9,055,498, and 9,113,374, all of which are incorporated herein by reference in their entirety.

Figure 3:
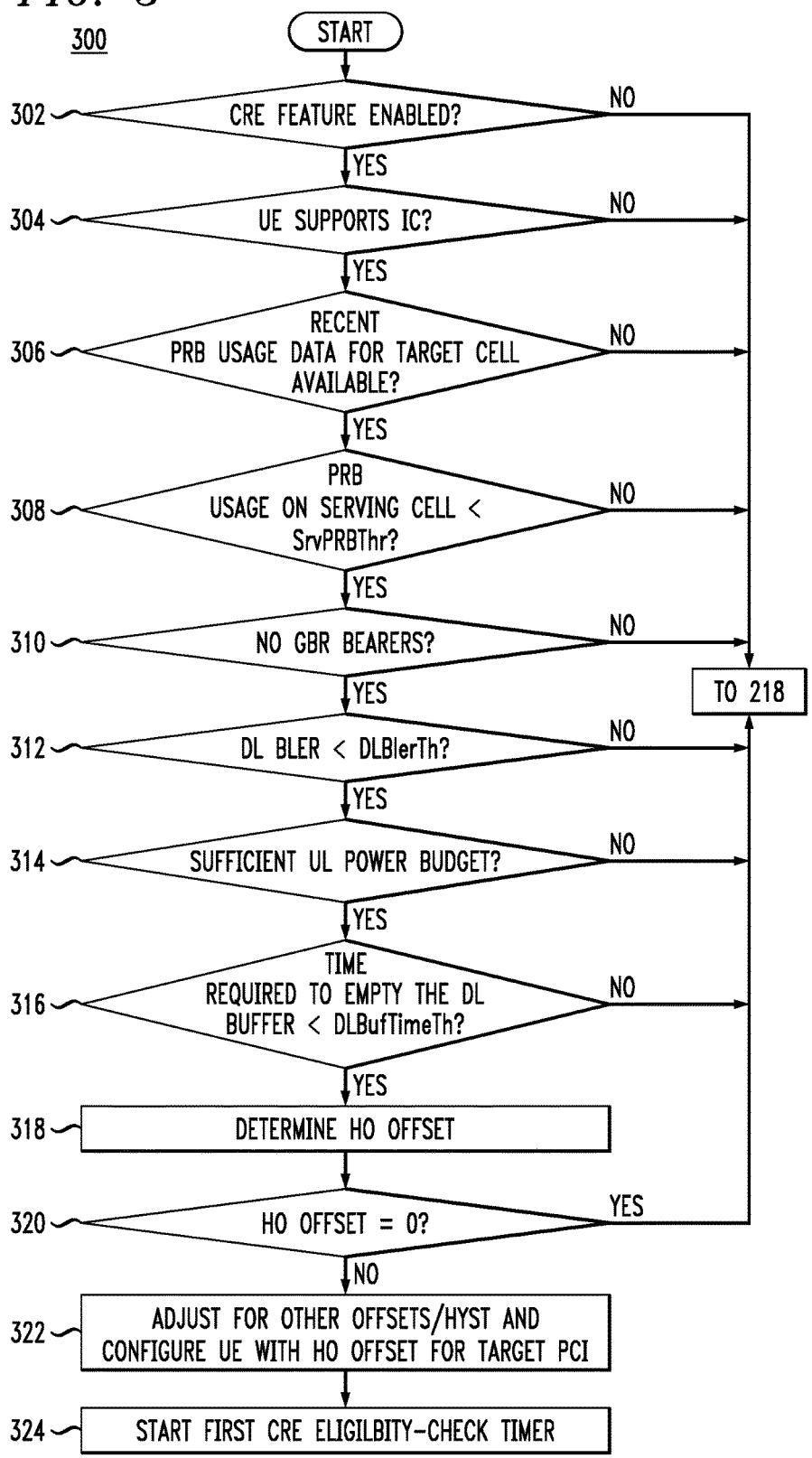
FIG. 3 shows a flowchart of a method of carrying out an initial cell-range-expansion (CRE)-eligibility check that can be used in the handover method of FIG. 2 according to an embodiment.

FIG. 3 shows a flowchart of a method 300 of carrying out an initial CRE-eligibility check that can be used to implement step 206 of method 200 according to an embodiment. Method 300 includes steps 302-316 that provide a series of checks to be carried out as a prerequisite to CRE. If any of the checks of steps 302-316 is not passed, then the CRE is not performed, and the processing of method 300 terminates by being redirected to step 218 of method 200 (see FIG. 2). Step 318 is executed only if all of the checks of steps 302-316 are passed (i.e., each of the posed questions is answered in the affirmative). Depending on the implementation specifics of the corresponding communication system, some of steps 302-316 may be optional and can be omitted in some embodiments.

Step 302 is performed to verify that the CRE functionality, in accordance with embodiments disclosed herein, is supported by mobile terminal 102 and base station 110₁.

Step 304 is performed to verify that mobile terminal 102 supports interference cancellation. Depending on the implementations specifics, the interference-cancellation capability verified at step 304 may include the above-mentioned CRS-IC and/or NAICS.

Step 306 is performed to verify that sufficiently recent PRB-usage data are available for the potential target cell, e.g., the cell anchored by base station 110₂. As explained below, e.g., in reference to FIGS. 5A-5B, PRB-usage data of the target cell are used to determine an appropriate value of the HO offset $h_1$ (see Eq. (2)). A person of ordinary skill in the art will appreciate that the "sufficiently recent" condition causes the determined value of the HO-offset $h_1$ to better correspond to the present traffic/cell-load conditions.

In an example embodiment, step 306 can be carried out by (i) determining the time difference between the present time and the time on the timestamp corresponding to the most-recent PRB-usage data and (ii) comparing this time difference with a corresponding fixed threshold value. The PRB-usage data are deemed to be "sufficiently recent" if the time difference is smaller than this fixed threshold value.

Step 308 is performed to verify that the PRB usage in the serving cell (e.g., the cell anchored by base station 110₁) is sufficiently low. In an example embodiment, step 306 can be carried out by comparing the current PRB usage with a corresponding fixed threshold value, which is denoted in FIG. 3 as SrvPRBThr. A person of ordinary skill in the art will appreciate that the "sufficiently low" PRB usage in the serving cell helps to more-easily absorb the additional load caused by the CRE.

Step 310 is performed to verify that no guaranteed-bit-rate (GBR) bearers are involved in the connection in question. A person of ordinary skill in the art will understand that the lower signal strength in the CRE zone of the serving cell (see FIG. 1) can potentially prevent the connection from properly carrying the GBR obligation.

Step 312 is performed to verify that the DL block error rate (BLER) is sufficiently low. In an example embodiment, step 312 can be carried out by comparing the current DL BLER with a corresponding fixed threshold value, which is denoted in FIG. 3 as DLBlerTh. A person of ordinary skill in the art will understand that the lower signal strength in the CRE zone of the serving cell (see FIG. 1) can potentially cause the DL BLER of the connection to increase in the CRE zone. Step 312 is therefore performed to confirm that there is enough of the BLER margin for this potential BLER increase.

Step 314 is performed to verify that mobile terminal 102 has enough UL power to handle the CRE. In an example embodiment, step 314 can be performed by checking the state of the UL-budget alarm. The UL-budget alarm is typically activated when the UE does not have enough power headroom to guarantee a specified amount of CRE to work. The decision on whether or not to activate the UL-budget alarm can be made based on the UL signal-to-noise and interference ratio (SINR) measurements and power headroom reports (PHRs) sent by the UE.

Step 316 is performed to verify that the estimated time for emptying out the DL buffer corresponding to mobile terminal 102 is sufficiently short. In an example embodiment, step 316 can be carried out by comparing the estimated time to empty with a corresponding fixed threshold value, which is denoted in FIG. 3 as DLBufTimeTh. A person of ordinary skill in the art will understand that a relatively large amount of data to be transmitted to mobile terminal 102 on the DL makes the handover very likely to occur (e.g., inevitable) despite the CRE. In this situation, step 316 causes the (inevitable) handover to be executed earlier rather than later, e.g., when radio conditions would become even less favorable.

At step 318, base station 110₁ determines the HO-offset value $h_1$ (see Eq. (2)) for mobile terminal 102. As already indicated above, the value of $h_1$ depends on the PRB usage of the target cell, e.g., the cell corresponding to base station 110₂ (also see step 306). An example embodiment of step 318 is described in more detail below in reference to FIGS. 5A-5B.

Step 320 serves to direct further HO processing to either step 218 of method 200 or to step 322. More specifically, if the value of $h_1$ determined at step 318 is zero, then further HO processing is directed to step 218 of method 200. Otherwise, further HO processing is directed to step 322.

At step 322, base station 110₁ may adjust the value of $h_1$ determined at step 318 by taking into account other offsets and/or hysteresis thresholds, if any of these are applied in the serving cell for the determination of the operative HO-threshold value Δ. The value of $h_1$ adjusted in this manner is then supplied to mobile terminal 102 by way of RRC connection-reconfiguration message 208 (see FIG. 2).

At step 324, base station 110₁ starts the above-mentioned first CRE eligibility-check timer.

Figure 4:
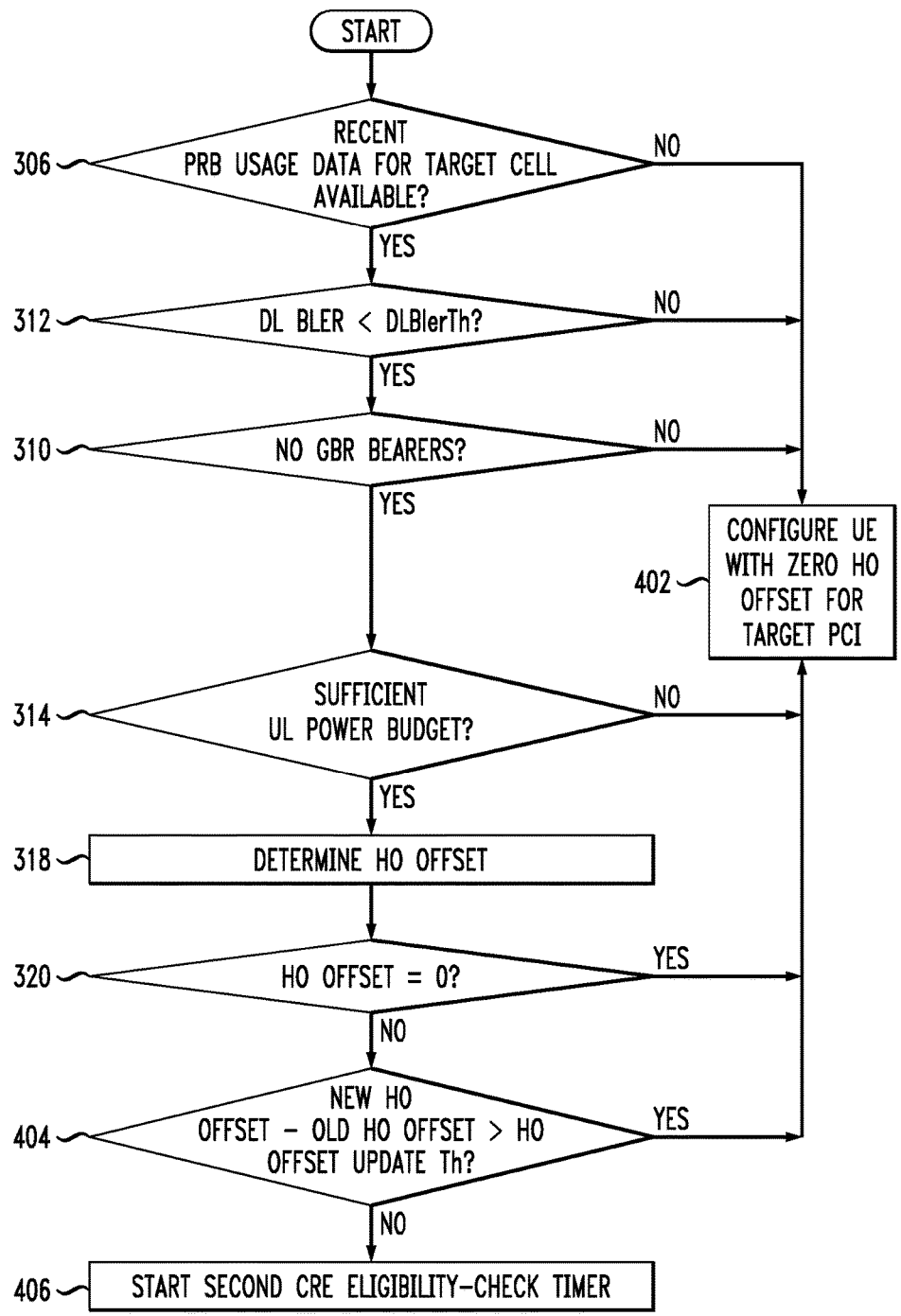
FIG. 4 shows a flowchart of a method of carrying out a follow-up CRE-eligibility check that can be used in the handover method of FIG. 2 according to an embodiment.

FIG. 4 shows a flowchart of a method 400 of carrying out a follow-up CRE-eligibility check that can be used to implement step 210 of method 200 according to an embodiment. Method 400 includes some of the same steps as method 300 (FIG. 3), and these steps are labeled in FIG. 4 using the same labels as in FIG. 3. In particular, method 400 includes steps 306, 310-314, 318, and 320, which are also used in method 300. The description of these steps is not repeated here. Instead, the description of method 400 below is mostly focused on the steps that are different from any of the steps of method 300.

Steps 306 and 310-314 in method 400 serve substantially the same purpose as the same steps in method 300. If any of the follow-up checks of steps 306 and 310-314 in method 400 is not passed, then the CRE is canceled by way of step

402. Step 318 in method 400 is executed only if all of the checks of steps 306 and 310-314 are passed. Depending on the implementation specifics of the corresponding communication system, some of steps 306 and 310-314 in method 400 may be optional and can be omitted in some embodiments.

At step 402, base station 110$_1$ sets the value of h$_1$ to zero. The zero value of h$_1$ is then supplied to mobile terminal 102 by way of RRC connection-reconfiguration message 212 (see FIG. 2). The effect of message 212 is to revert mobile terminal 102 to the initial HO configuration (e.g., the configuration that was in effect before step 206, FIG. 2), thereby canceling the CRE.

Step 404 is performed to prevent updating the HO-offset value h$_1$ too often, e.g., because signaling messages have an associated cost in terms of the taken bandwidth. The criterion used at step 404 for this purpose is to compare the difference between the value of h$_1$ determined at the most-recent step 318 of method 400 and the previous value of h$_1$ with a corresponding fixed threshold value, which is denoted in FIG. 4 as HOOffsetUpdateTh. If the HO-offset difference is greater than this threshold value, then the processing of method 400 is directed to step 402. Otherwise, the processing of method 400 is directed to step 406.

At step 406, base station 110$_1$ starts the above-mentioned second CRE eligibility-check timer.

Figure 5A:
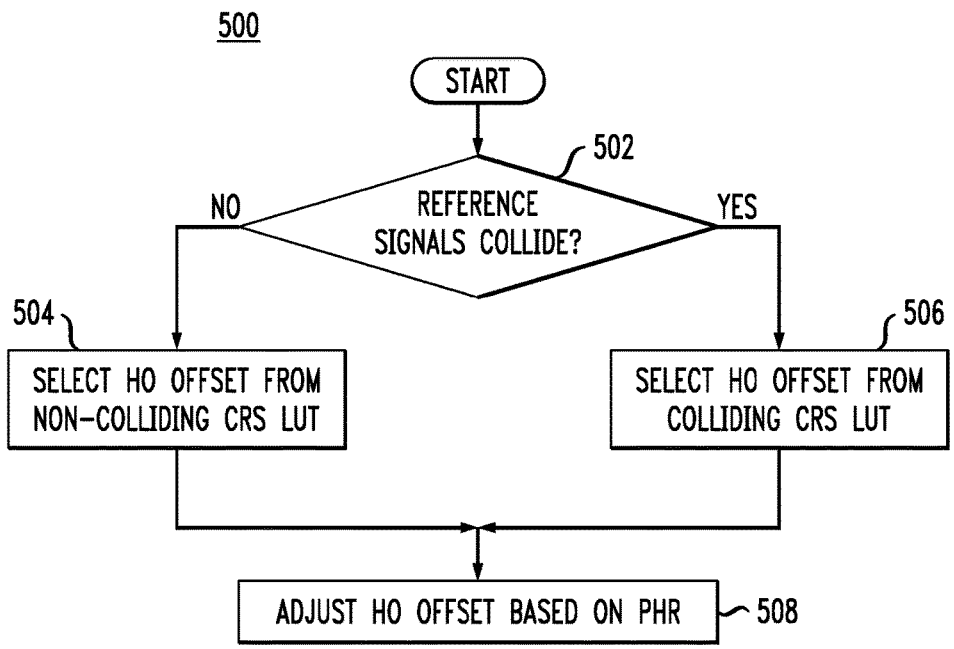
FIGS. 5A-5B illustrate a method of determining the value of the handover offset that can be used in the methods of FIGS. 3 and 4 according to an embodiment.
Figure 5B:
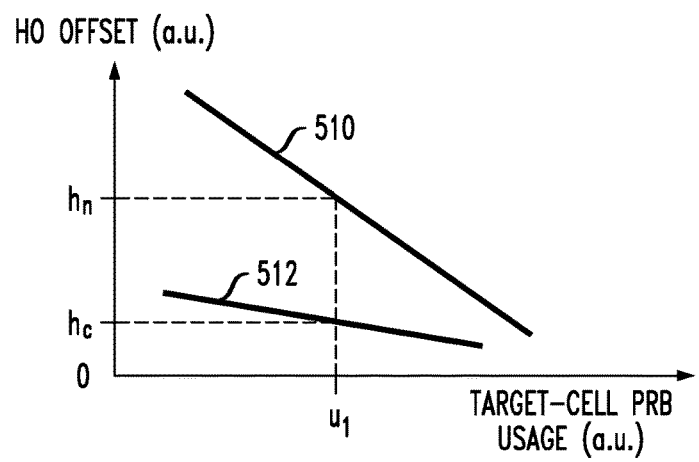

FIGS. 5A-5B illustrate a method 500 of determining the value of the HO offset h$_1$ that can be used to implement step 318 of methods 300 and 400 according to an embodiment. More specifically, FIG. 5A shows a flowchart of method 500. FIG. 5B graphically illustrates an example dependence of the HO-offset value on the PRB usage of the target cell (e.g., the cell corresponding to base station 110$_2$) that can be used in method 500.

At step 502 of method 500, it is determined whether or not the CRS's of the currently serving cell (e.g., the cell currently providing the radio bearer to the UE) and the target cell (e.g., the cell corresponding to base station 110$_2$) collide. In an example embodiment, this determination can be made based on the physical cell identifiers (PCIs) of the two cells. More specifically, if (PCI$_1$ mod 3)=(PCI$_2$ mod 3), then the CRS's collide, where PCI$_1$ and PCI$_2$ are the physical cell identifiers of the serving and target cells, respectively, and the term "mod" denotes the arithmetic modulo operation. On the other hand, if (PCI$_1$ mod 3)≠(PCI$_2$ mod 3), then the CRS's do not collide. In alternative embodiments, other suitable methods of making the collision/non-collision determination can also be used.

If it is determined at step 502 that the CRS's do not collide, then the processing of method 500 is directed to step 504. Otherwise, the processing of method 500 is directed to step 506.

At step 504 or 506, the serving base station selects an appropriate value of the HO offset from the corresponding look-up table (LUT). In an example embodiment, the LUT lists different HO-offset values for different levels of PRB usage in the target cell. Hence, the recent PRB-usage data that were checked at step 306 of method 300 or 400 can be used to select the corresponding value of the HO offset from the LUT. Note, however, that different respective LUTs are used at step 504 and step 506.

FIG. 5B graphically shows example relationships between the HO offset and the PRB usage in the target cell that can be tabulated in the LUTs. More specifically, a line labeled 510 in FIG. 5B represents an example relationship between the HO offset and the PRB usage that can be tabulated in the LUT used at step 504. A line labeled 512 in FIG. 5B similarly represents an example relationship between the HO offset and the PRB usage that can be tabulated in the LUT used at step 506.

Although each of lines 510 and 512 indicates a respective linear relationship between the HO offset and the PRB usage in the target cell, other (e.g., non-linear) functions can be used in alternative embodiments. In general, the functions that can be used for this purpose possess one or more of the following characteristics.

For the same PRB-usage level, the tabulated HO offset for the case of non-colliding CRS's used at step 504 is larger than the tabulated HO offset for the case of colliding CRS's used at step 506. This attribute is illustrated in FIG. 5B by the fact that the HO offset h$_n$ corresponding to the case of non-colliding CRS's is greater than the HO offset h$_c$ corresponding to the case of colliding CRS's, with both of these HO offsets corresponding to the same PRB-usage level, u$_1$.

The HO offset decreases monotonically as the PRB usage increases. There is a critical PRB-usage level above which the HO offset is zero. The critical PRB-usage levels corresponding to the cases of colliding and non-colliding CRS's may differ from one another.

In some embodiments, LUT-based implementations of steps 504 and 506 can be replaced by suitable alternative implementations. For example, a program code executed by a general-purpose processor can be used to calculate the HO offsets h$_n$ and h$_c$ based on the inputted PRB-usage level.

At step 508, the HO-offset value selected at step 504 or step 506 can be adjusted down based on the PHR corresponding to mobile terminal 102. As known in the art, the PHR indicates how much transmission power is left for the mobile terminal to use in addition to the power that is already being used for the current transmissions. Since the use of CRE delays the handoff, the UE might potentially move farther away from the center of the serving cell, thereby causing the path-loss to the serving cell to increase, requiring more transmit power from the UE. As a result, the HO offset h$_1$ needs to be selected such that the corresponding additional power stays within the available power headroom. Therefore, an adjustment of the HO offsets h$_n$ and h$_c$ determined at steps 504 and 506 might be necessary at step 508 when the power headroom is relatively small. No adjustment is necessary if the power headroom is sufficiently large. The HO offset value obtained after the execution of step 508 is the value of the HO offset h$_1$ that is used in the steps located downstream from step 318 in methods 300 and 400.

As used herein, the term "PRB usage" refers to the percentage of physical resource blocks in use, e.g., the number of used PRBs divided by the total number of available PRBs, with the result being expressed in percentage points. In an example embodiment, the serving cell can obtain the PRB-usage data from the neighbor cells using the 3GPP X2 interface, which is a logical link between eNBs.

According to an example embodiment disclosed above in reference to FIGS. 1-5, provided is an apparatus comprising: an electronic processor (e.g., 112, FIG. 1) operable to determine (e.g., using 318, FIGS. 3-4) a handover-offset value (e.g., h$_1$, Eq. (2)) to change a handover threshold (e.g., Δ, Eq. (1)) to be used to trigger a handover of a wireless connection of a mobile terminal (e.g., 102, FIG. 1) from a first cell (e.g., corresponding to 110$_1$, FIG. 1) to a second cell (e.g., corresponding to 110$_2$, FIG. 1), the handover-offset value being determined based on a resource-utilization level of the second cell (e.g., using 500, FIG. 5); and a radio transmitter (e.g., 114, FIG. 1) operable to transmit a control message (e.g., 208, 212, FIG. 2) to cause the mobile terminal to change the handover threshold.

In some embodiments of the above apparatus, the handover-offset value depends (e.g., as indicated in FIG. 5B) on whether or not a reference signal corresponding to the first cell collides with a reference signal corresponding to the second cell.

In some embodiments of any of the above apparatus, the handover-offset value is larger if the reference signals do not collide than if the reference signals collide.

In some embodiments of any of the above apparatus, the handover-offset value further depends on a power headroom of the mobile terminal (e.g., by way of 508, FIG. 5A).

In some embodiments of any of the above apparatus, the handover-offset value decreases as the resource-utilization level in the second cell increases (e.g., as indicated in FIG. 5B).

In some embodiments of any of the above apparatus, the apparatus is a base station (e.g., 110$_1$, FIG. 1) corresponding to the first cell.

According to another example embodiment disclosed above in reference to FIGS. 1-5, provided is a communication method (e.g., 200, FIG. 2) comprising the steps of: determining (e.g., 318, FIGS. 3-4) a handover-offset value (e.g., $h_1$, Eq. (2)) to change a handover threshold (e.g., $\Delta$, Eq. (1)) to be used to trigger a handover of a wireless connection of a mobile terminal (e.g., 102, FIG. 1) from a first cell (e.g., corresponding to 110$_1$, FIG. 1) to a second cell (e.g., corresponding to 110$_2$, FIG. 1), with the handover-offset value being determined based on a resource-utilization level of the second cell (e.g., using 500, FIG. 5); and transmitting a control message (e.g., 208, 212, FIG. 2) to cause the mobile terminal to change the handover threshold.

In some embodiments of the above method, the method further comprises receiving a measurement report (e.g., 204, FIG. 2) from the mobile terminal, the measurement report containing at least a first signal-strength value (e.g., $S_1$, Eq. (1)) corresponding to the first cell and a second signal-strength value (e.g., $S_2$, Eq. (1)) corresponding to the second cell;

and wherein said determining the handover-offset value is performed in response to said receiving the measurement report.

In some embodiments of any of the above methods, the handover-offset value depends (e.g., as indicated in FIG. 5B) on whether or not a reference signal corresponding to the first cell collides with a reference signal corresponding to the second cell.

In some embodiments of any of the above methods, the method further comprises determining whether or not the reference signals collide by comparing a value of (PCI$_1$ mod 3) and a value of (PCI$_2$ mod 3), where PCI$_1$ is a physical cell identifier of the first cell and PCI$_2$ is a physical cell identifier of the second cell.

In some embodiments of any of the above methods, the handover-offset value is larger if the reference signals do not collide than if the reference signals collide.

In some embodiments of any of the above methods, the handover-offset value further depends on a power headroom of the mobile terminal (e.g., by way of 508, FIG. 5A).

In some embodiments of any of the above methods, the handover-offset value linearly depends on the resource-utilization level of the second cell (e.g., as indicated in FIG. 5B).

In some embodiments of any of the above methods, the handover-offset value decreases as the resource-utilization level in the second cell increases (e.g., as indicated in FIG. 5B).

In some embodiments of any of the above methods, said determining the handover-offset value comprises receiving physical-resource-block usage data corresponding to the second cell (e.g., to satisfy 306, FIGS. 3-4).

In some embodiments of any of the above methods, said determining the handover-offset value further comprises selecting (e.g., 504-506, FIG. 5A) the handover-offset value from a look-up table using the physical-resource-block usage data corresponding to the second cell or computing the handover-offset value using a pre-programmed function that takes the physical-resource-block usage data corresponding to the second cell as an input thereto.

In some embodiments of any of the above methods, the method further comprises performing a set of checks (e.g., 302-316, FIG. 3) prior to said determining the handover-offset value; and wherein said determining the handover-offset value is performed only if each check in the set of checks is passed.

In some embodiments of any of the above methods, the set of checks includes one or more of the following: verifying (e.g., 304, FIG. 3) that that the mobile terminal supports interference cancellation; verifying (e.g., 306, FIG. 3) that an age of available physical-resource-block usage data corresponding to the second cell is smaller than a first threshold value; verifying (e.g., 308, FIG. 3) that a resource-utilization level of the first cell is smaller than a second threshold value (e.g., SrvPRBThr, FIG. 3); verifying (e.g., 310, FIG. 3) that no guaranteed-bit-rate bearers are associated with the wireless connection; verifying (e.g., 312, FIG. 3) that a downlink error rate is smaller than a third threshold value (e.g., DLBlerTh, FIG. 3); and verifying (e.g., 316, FIG. 3) that an estimated time for emptying out a downlink buffer corresponding to the mobile terminal is smaller than a fourth threshold value (e.g., DLBufTimeTh, FIG. 3).

In some embodiments of any of the above methods, said determining the handover-offset value includes adjusting (e.g., 322, FIG. 3) the handover-offset value for one or both of another operative handover offset and a hysteresis threshold.

In some embodiments of any of the above methods, the method further comprises: starting a timer (e.g., 324, FIG. 3) after completing said determining the handover-offset value; and re-determining the handover-offset value (e.g., using 400, FIG. 4) if the timer runs out.

In some embodiments of any of the above methods, the method further comprises: receiving a measurement report (e.g., 216, FIG. 2) from the mobile terminal that indicates that a changed handover threshold corresponding to the control message is reached; and transmitting a handover command (e.g., 220, FIG. 2) to cause the mobile terminal to execute a handover sequence that transfers the wireless connection from the first cell to the second cell, with the handover command being transmitted in response to said receiving the measurement report.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

It should be appreciated by those of ordinary skill in the art that any block diagrams herein represent conceptual views of illustrative circuitry embodying the disclosed principles. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A communication method comprising:
performing one or more checks, said one or more checks including verifying that a mobile terminal supports interference cancellation;
determining a handover-offset value to change a handover threshold to be used to trigger a handover of a wireless connection of the mobile terminal from a first cell to a second cell, with the handover-offset value being determined based on a resource-utilization level of the second cell; and
transmitting a control message to cause the mobile terminal to change the handover threshold, wherein said control message is transmitted in response to said one or more checks having been passed.

2. The communication method of claim 1, further comprising receiving a measurement report from the mobile terminal, the measurement report containing at least a first signal-strength value corresponding to the first cell and a second signal-strength value corresponding to the second cell; and
wherein said determining the handover-offset value is performed in response to said receiving the measurement report.

3. The communication method of claim 1, wherein the handover-offset value depends on whether or not a cell-specific reference signal corresponding to the first cell collides with a cell-specific reference signal corresponding to the second cell.

4. The communication method of claim 3, further comprising determining whether or not the cell-specific reference signals collide by comparing a value of ($PCI_1$ mod 3) and a value of ($PCI_2$ mod 3), where $PCI_1$ is a physical cell identifier of the first cell, $PCI_2$ is a physical cell identifier of the second cell, and mod denotes an arithmetic modulo operation.

5. The communication method of claim 3, wherein the handover-offset value is larger if the cell-specific reference signals do not collide than if the cell-specific reference signals collide.

6. The communication method of claim 3, wherein the handover-offset value further depends on a power headroom of the mobile terminal.

7. The communication method of claim 1, wherein the handover-offset value linearly depends on the resource-utilization level of the second cell.

8. The communication method of claim 1, wherein the handover-offset value decreases as the resource-utilization level in the second cell increases.

9. The communication method of claim 1, wherein said determining the handover-offset value comprises receiving physical-resource-block usage data corresponding to the second cell.

10. The communication method of claim 9, wherein said determining the handover-offset value further comprises selecting the handover-offset value from a look-up table using the physical-resource-block usage data corresponding to the second cell or computing the handover-offset value using a pre-programmed function that takes the physical-resource-block usage data corresponding to the second cell as an input thereto.

11. The communication method of claim 1, wherein said one or more checks further include one or more of the following:
   verifying that that the mobile terminal supports a cell-range-expansion functionality;
   verifying that an age of available physical-resource-block usage data corresponding to the second cell is smaller than a first threshold value;
   verifying that a resource-utilization level of the first cell is smaller than a second threshold value;
   verifying that no guaranteed-bit-rate bearers are associated with the wireless connection;
   verifying that a downlink error rate is smaller than a third threshold value; and
   verifying that an estimated time for emptying out a downlink buffer corresponding to the mobile terminal is smaller than a fourth threshold value.

12. The communication method of claim 1, wherein said determining the handover-offset value includes adjusting the handover-offset value for one or both of another operative handover offset and a hysteresis threshold.

13. The communication method of claim 1, further comprising:
   starting a timer after completing said determining the handover-offset value; and
   re-determining the handover-offset value if the timer runs out.

14. The communication method of claim 1, further comprising:
   receiving a measurement report from the mobile terminal that indicates that a changed handover threshold corresponding to the control message is reached; and
   transmitting a handover command to cause the mobile terminal to execute a handover sequence that transfers the wireless connection from the first cell to the second cell, with the handover command being transmitted in response to said receiving the measurement report.

15. The communication method of claim 1, wherein the interference cancellation includes one or both of cell-specific reference-signal interference cancellation and network-assisted interference cancellation.

16. An apparatus comprising:
   an electronic processor operable to:
      perform one or more checks, said one or more checks including verifying that a mobile terminal supports interference cancellation; and
      determine a handover-offset value to change a handover threshold to be used to trigger a handover of a wireless connection of the mobile terminal from a first cell to a second cell, the handover-offset value being determined based on a resource-utilization level of the second cell; and
   a radio transmitter operable to transmit a control message to cause the mobile terminal to change the handover threshold; and
   wherein the radio transmitter is configured to transmit said control message in response to said one or more checks having been passed.

17. The apparatus of claim 16, wherein the handover-offset value depends on whether or not a cell-specific reference signal corresponding to the first cell collides with a cell-specific reference signal corresponding to the second cell.

18. The apparatus of claim 17, wherein the handover-offset value is larger if the cell-specific reference signals do not collide than if the reference signals collide.

19. The apparatus of claim 17, wherein the handover-offset value further depends on a power headroom of the mobile terminal.

20. The apparatus of claim 16, wherein the handover-offset value decreases as the resource-utilization level in the second cell increases.

21. The apparatus of claim 16, wherein the apparatus is a base station corresponding to the first cell.

* * * * *